US008123384B2

(12) United States Patent  (10) Patent No.: US 8,123,384 B2
Negley et al.  (45) Date of Patent: Feb. 28, 2012

(54) OPTICAL ELEMENTS WITH INTERNAL OPTICAL FEATURES AND METHODS OF FABRICATING SAME

(75) Inventors: Gerald H. Negley, Durman, NC (US); Paul Kenneth Pickard, Morrisville, NJ (US)

(73) Assignee: Cree, Inc., Durham, NC (US)

( * ) Notice: Subject to any disclaimer, the term of this patent is extended or adjusted under 35 U.S.C. 154(b) by 737 days.

(21) Appl. No.: 12/174,053

(22) Filed: Jul. 16, 2008

(65) Prior Publication Data

US 2009/0021841 A1  Jan. 22, 2009

Related U.S. Application Data

(60) Provisional application No. 60/950,193, filed on Jul. 17, 2008, provisional application No. 61/023,973, filed on Jan. 28, 2008.

(51) Int. Cl.
*F21V 5/00*  (2006.01)
(52) U.S. Cl. .................................. 362/331; 362/330
(58) Field of Classification Search .................. 362/330, 362/331
See application file for complete search history.

(56) References Cited

U.S. PATENT DOCUMENTS

| | | | |
|---|---|---|---|
| 3,805,937 A | 4/1974 | Hatanaka et al. |
| 3,927,290 A | 12/1975 | Denley |
| 4,152,618 A | 5/1979 | Abe et al. |
| 4,154,219 A | 5/1979 | Gupta et al. |
| 4,168,102 A | 9/1979 | Chida et al. |
| 4,325,146 A | 4/1982 | Lennington |
| 4,346,275 A | 8/1982 | Ieakiri et al. |
| 4,408,157 A | 10/1983 | Beaubien |
| 4,420,398 A | 12/1983 | Castino |
| 4,476,620 A | 10/1984 | Ohki et al. |
| 4,545,366 A | 10/1985 | O'Neill |
| 4,711,972 A | 12/1987 | O'Neill |
| 4,865,685 A | 9/1989 | Palmour |
| 4,902,356 A | 2/1990 | Noguchi et al. |
| 4,912,532 A | 3/1990 | Cook et al. |
| 4,918,497 A | 4/1990 | Edmond |
| 4,946,547 A | 8/1990 | Palmour et al. |
| 4,966,862 A | 10/1990 | Edmond |
| 4,981,551 A | 1/1991 | Palmour |
| 5,027,168 A | 6/1991 | Edmond |
| 5,087,883 A | 2/1992 | Hoffman |

(Continued)

FOREIGN PATENT DOCUMENTS

EP  0 684 648  11/1995

(Continued)

OTHER PUBLICATIONS

Narendran et al., "Solid State lighting: failure analysis of white LEDs," Journal of Cystal Growth, vol. 268, Issues 1-4, Aug. 2004, Abstract.

(Continued)

*Primary Examiner* — Laura Tso
(74) *Attorney, Agent, or Firm* — Burr & Brown

(57) ABSTRACT

An optical element, comprising a substrate and at least one optical film. The substrate is at least partially light-transmissive. The optical film comprises at least a first optical feature and is positioned on a contact surface of the substrate. Also, a lighting device comprising at least one solid state light emitter and such an optical element. Also, methods for making an optical element by molding (e.g., film insert molding), bonding or laminating.

44 Claims, 4 Drawing Sheets

U.S. PATENT DOCUMENTS

| | | |
|---|---|---|
| 5,087,949 A | 2/1992 | Haitz et al. |
| 5,103,271 A | 4/1992 | Izumiya et al. |
| 5,200,022 A | 4/1993 | Kong et al. |
| 5,210,051 A | 5/1993 | Carter |
| 5,264,997 A | 11/1993 | Hutchisson et al. |
| 5,277,840 A | 1/1994 | Osaka et al. |
| 5,338,944 A | 8/1994 | Edmond et al. |
| 5,376,241 A | 12/1994 | Shor et al. |
| 5,376,580 A | 12/1994 | Kish et al. |
| RE34,861 E | 2/1995 | Davis et al. |
| 5,393,993 A | 2/1995 | Edmond et al. |
| 5,407,799 A | 4/1995 | Studier |
| 5,410,519 A | 4/1995 | Hall et al. |
| 5,416,342 A | 5/1995 | Edmond et al. |
| 5,502,316 A | 3/1996 | Kish et al. |
| 5,523,589 A | 6/1996 | Edmond et al. |
| 5,563,849 A | 10/1996 | Hall et al. |
| 5,604,135 A | 2/1997 | Edmond et al. |
| 5,631,190 A | 5/1997 | Negley |
| 5,644,156 A | 7/1997 | Suzuki et al. |
| 5,739,554 A | 4/1998 | Edmond et al. |
| 5,813,753 A | 9/1998 | Vriens et al. |
| 5,820,253 A | 10/1998 | Scholz |
| 5,858,278 A | 1/1999 | Itoh et al. |
| 5,912,477 A | 6/1999 | Negley |
| 5,924,785 A | 7/1999 | Zhang et al. |
| 5,939,732 A | 8/1999 | Kurtz et al. |
| 5,959,316 A | 9/1999 | Lowery |
| 5,985,687 A | 11/1999 | Bowers et al. |
| 6,031,179 A | 2/2000 | O'Neill |
| 6,069,440 A | 5/2000 | Shimizu et al. |
| 6,071,795 A | 6/2000 | Cheung et al. |
| 6,075,200 A | 6/2000 | O'Neill |
| 6,095,666 A | 8/2000 | Salam |
| 6,120,600 A | 9/2000 | Edmond et al. |
| 6,187,606 B1 | 2/2001 | Edmond et al. |
| 6,201,262 B1 | 3/2001 | Edmond et al. |
| 6,225,647 B1 | 5/2001 | Kurtz et al. |
| 6,252,254 B1 | 6/2001 | Soules et al. |
| 6,258,699 B1 | 7/2001 | Chang et al. |
| 6,274,924 B1 | 8/2001 | Carey et al. |
| 6,292,901 B1 | 9/2001 | Lys et al. |
| 6,303,405 B1 | 10/2001 | Yoshida et al. |
| 6,335,538 B1 | 1/2002 | Prutchi et al. |
| 6,348,766 B1 | 2/2002 | Ohishi et al. |
| 6,357,889 B1 | 3/2002 | Duggal et al. |
| 6,365,429 B1 | 4/2002 | Kneissl et al. |
| 6,394,621 B1 | 5/2002 | Hanewinkel, III |
| 6,410,942 B1 | 6/2002 | Thibeault et al. |
| 6,420,199 B1 | 7/2002 | Coman et al. |
| 6,420,242 B1 | 7/2002 | Cheung et al. |
| 6,429,460 B1 | 8/2002 | Chen et al. |
| 6,448,102 B1 | 9/2002 | Kneissl et al. |
| 6,465,809 B1 | 10/2002 | Furukawa et al. |
| 6,468,824 B2 | 10/2002 | Chen et al. |
| 6,483,196 B1 | 11/2002 | Wojnarowski et al. |
| 6,559,075 B1 | 5/2003 | Kelly et al. |
| 6,562,648 B1 | 5/2003 | Wong et al. |
| 6,578,998 B2 | 6/2003 | Zhang |
| 6,607,931 B2 | 8/2003 | Streubel |
| 6,624,350 B2 | 9/2003 | Nixon et al. |
| 6,657,236 B1 | 12/2003 | Thibeault et al. |
| 6,677,173 B2 | 1/2004 | Ota |
| 6,716,654 B2 | 4/2004 | Hsu et al. |
| 6,740,604 B2 | 5/2004 | Kelly et al. |
| 6,757,314 B2 | 6/2004 | Kneissl et al. |
| 6,786,390 B2 | 9/2004 | Yang et al. |
| 6,791,257 B1 | 9/2004 | Sato et al. |
| 6,800,500 B2 | 10/2004 | Coman et al. |
| 6,806,112 B1 | 10/2004 | Horng et al. |
| 6,809,341 B2 | 10/2004 | Hsu et al. |
| 6,846,686 B2 | 1/2005 | Saeki et al. |
| 6,849,878 B2 | 2/2005 | Bader et al. |
| 6,853,010 B2 | 2/2005 | Slater, Jr. et al. |
| 6,857,767 B2 | 2/2005 | Matsui et al. |
| 6,871,982 B2 | 3/2005 | Holman et al. |
| 6,880,954 B2 | 4/2005 | Ollett et al. |
| 6,884,647 B2 | 4/2005 | Sakai et al. |
| 6,921,926 B2 | 7/2005 | Hsu |
| 6,949,401 B2 | 9/2005 | Kaminski et al. |
| 6,972,438 B2 | 12/2005 | Li et al. |
| 7,001,047 B2 | 2/2006 | Holder et al. |
| 7,029,935 B2 | 4/2006 | Negley et al. |
| 7,084,435 B2 | 8/2006 | Sugimoto et al. |
| 7,093,958 B2 | 8/2006 | Coushaine |
| 7,116,308 B1 | 10/2006 | Heeks et al. |
| 7,131,760 B2 | 11/2006 | Mayer et al. |
| 7,178,941 B2 | 2/2007 | Roberge et al. |
| 7,183,587 B2 | 2/2007 | Negley et al. |
| 7,213,940 B1 | 5/2007 | Van De Ven et al. |
| 7,244,058 B2 | 7/2007 | DiPenti et al. |
| 7,246,921 B2 | 7/2007 | Jacobson et al. |
| 7,264,378 B2 | 9/2007 | Loh et al. |
| 7,276,861 B1 | 10/2007 | Shteynberg et al. |
| 7,355,284 B2 | 4/2008 | Negley et al. |
| 7,374,311 B2 | 5/2008 | Rains, Jr. et al. |
| 2002/0006350 A1 | 1/2002 | Nishida et al. |
| 2002/0087532 A1 | 7/2002 | Barritz et al. |
| 2002/0088987 A1 | 7/2002 | Sakurai |
| 2002/0123164 A1 | 9/2002 | Slater, Jr. et al. |
| 2002/0139990 A1 | 10/2002 | Suehiro et al. |
| 2002/0149576 A1 | 10/2002 | Tanaka et al. |
| 2002/0153835 A1 | 10/2002 | Fujiwara et al. |
| 2002/0163302 A1 | 11/2002 | Nitta et al. |
| 2003/0006418 A1 | 1/2003 | Emerson et al. |
| 2003/0034985 A1 | 2/2003 | Needham Riddle et al. |
| 2003/0117798 A1 | 6/2003 | Leysath |
| 2003/0173602 A1 | 9/2003 | Hsu et al. |
| 2003/0209714 A1 | 11/2003 | Taskar et al. |
| 2004/0070004 A1 | 4/2004 | Eliashevich et al. |
| 2004/0072106 A1 | 4/2004 | Chua et al. |
| 2004/0072382 A1 | 4/2004 | Kelly et al. |
| 2004/0090794 A1 | 5/2004 | Ollett et al. |
| 2004/0094774 A1 | 5/2004 | Steigerwald et al. |
| 2004/0096666 A1 | 5/2004 | Knox et al. |
| 2004/0130912 A1 | 7/2004 | Miyashita |
| 2004/0188697 A1 | 9/2004 | Brunner et al. |
| 2004/0207313 A1 | 10/2004 | Omoto et al. |
| 2004/0212998 A1 | 10/2004 | Mohacsi |
| 2004/0264212 A1 | 12/2004 | Chung et al. |
| 2005/0001537 A1 | 1/2005 | West et al. |
| 2005/0007306 A1 | 1/2005 | Iisaka et al. |
| 2005/0058947 A1 | 3/2005 | Rinehart et al. |
| 2005/0058948 A1 | 3/2005 | Freese et al. |
| 2005/0058949 A1 | 3/2005 | Wood et al. |
| 2005/0062140 A1 | 3/2005 | Leung |
| 2005/0077535 A1 | 4/2005 | Li |
| 2005/0082562 A1 | 4/2005 | Ou et al. |
| 2005/0099478 A1 | 5/2005 | Iwase |
| 2005/0117320 A1 | 6/2005 | Leu et al. |
| 2005/0135441 A1 | 6/2005 | Ng et al. |
| 2005/0152127 A1 | 7/2005 | Kamiya et al. |
| 2005/0161586 A1 | 7/2005 | Rains, Jr. et al. |
| 2005/0168689 A1 | 8/2005 | Knox |
| 2005/0227379 A1 | 10/2005 | Donofrio |
| 2005/0237739 A1 | 10/2005 | Lee et al. |
| 2005/0274972 A1 | 12/2005 | Roth et al. |
| 2005/0280756 A1 | 12/2005 | Kim et al. |
| 2006/0061869 A1 | 3/2006 | Fadel et al. |
| 2006/0081773 A1 | 4/2006 | Rains, Jr. et al. |
| 2006/0114422 A1 | 6/2006 | Miyazawa et al. |
| 2006/0114569 A1 | 6/2006 | Capaldo et al. |
| 2006/0139953 A1* | 6/2006 | Chou et al. ............ 362/613 |
| 2006/0146562 A1* | 7/2006 | Ko et al. ............ 362/561 |
| 2006/0158080 A1 | 7/2006 | Nakano et al. |
| 2006/0164729 A1 | 7/2006 | Wood |
| 2006/0220046 A1 | 10/2006 | Yu et al. |
| 2006/0275714 A1 | 12/2006 | Rinehart et al. |
| 2006/0285332 A1 | 12/2006 | Goon et al. |
| 2007/0003868 A1 | 1/2007 | Wood et al. |
| 2007/0008738 A1 | 1/2007 | Han et al. |
| 2007/0014004 A1 | 1/2007 | Wood |
| 2007/0047204 A1 | 3/2007 | Parker et al. |
| 2007/0090383 A1 | 4/2007 | Ota et al. |
| 2007/0127098 A1 | 6/2007 | Wood |
| 2007/0127129 A1 | 6/2007 | Wood et al. |
| 2007/0188425 A1 | 8/2007 | Saccomanno |

| | | |
|---|---|---|
| 2007/0216704 A1 | 9/2007 | Roberts et al. |
| 2007/0242441 A1 | 10/2007 | Aldrich et al. |
| 2008/0036364 A1 | 2/2008 | Li et al. |
| 2008/0043489 A1* | 2/2008 | Etori ........................... 362/618 |
| 2008/0049451 A1* | 2/2008 | Wang et al. ................. 362/620 |
| 2008/0055937 A1* | 3/2008 | Chuang et al. ............... 362/627 |
| 2008/0074032 A1 | 3/2008 | Yano et al. |
| 2008/0074892 A1* | 3/2008 | Chuang ........................ 362/355 |
| 2008/0103714 A1 | 5/2008 | Aldrich et al. |
| 2009/0213464 A1 | 8/2009 | Kurachi et al. |

FOREIGN PATENT DOCUMENTS

| | | |
|---|---|---|
| EP | 0 936 682 | 8/1999 |
| EP | 1 059 667 | 12/2000 |
| EP | 1 081 771 | 3/2001 |
| EP | 1 111 966 | 6/2001 |
| EP | 1 156 020 | 11/2001 |
| EP | 1 198 016 | 4/2002 |
| EP | 1 246 266 | 10/2002 |
| EP | 1 263 058 | 12/2002 |
| EP | 1 345 275 | 9/2003 |
| EP | 1 486 818 | 12/2004 |
| EP | 1 553 431 | 7/2005 |
| JP | 57-076885 | 5/1982 |
| JP | 61-059886 | 3/1986 |
| JP | 05-100106 | 4/1993 |
| JP | 07-007179 | 10/1995 |
| JP | 08-116094 | 5/1996 |
| JP | 11-238913 | 8/1999 |
| JP | 11-251638 | 9/1999 |
| JP | 2003-318448 | 11/2003 |
| WO | 98/43014 | 10/1998 |
| WO | 98/56043 | 12/1998 |
| WO | 00/34709 | 6/2000 |
| WO | 03/005458 | 1/2003 |
| WO | 03/007663 | 1/2003 |
| WO | 03/010832 | 2/2003 |
| WO | 2005/104247 | 11/2005 |
| WO | 2007/026776 | 3/2007 |
| WO | 2007/061758 | 5/2007 |

OTHER PUBLICATIONS

Kim, J. K. et al., "Strongly Enhanced Phosphor Efficiency in GaInN White Light-Emitting Diodes Using Remote Phosphor Configuration and Diffuse Reflector Cup," Japanese Journal of Applied Physics, Japan Socient of applied Physics, Tokyo, JP, vol. 44, No. 20-23, XP-001236966, Jan. 1, 2005.
Nichia, White LED, Part Nos. NSPW300BS, "Specifications for Nichia White LED, Model NSPW300BS," Nichia Corporation, Jan. 12, 2004.
Nichia, White LED, Part Nos. NSPW312BS, "Specifications for Nichia White LED, Model NSPW312BS," Nichia Corporation, Jan. 14, 2004.
Sakai et al., *Experimental Investigation of Dependence of Electrical Characteristics on Device Parameters in Trench Mos BarrierShottky Diodes*, Proceedings of 1998 International Symposium on Power Semiconductor Devices & ICs, Kyoto, pp. 293-296, Jun. 1998.
Zhang Ap et al., *Comparison of GAN P-I-N and Schottky Rectifier Performance*, IEEE Transactions on Electron Devices, IEEE Inc., New York, US, vol. 48, No. 3, pp. 407-411, Mar. 2001.
American Handbook of Physics Handbook, 3rd Edition, McGraw-Haill, Ed: Dwight E. Gray, 1972.
Kasugai et al., *Moth-Eye Light-Emitting Diodes*, Mater Res. Soc. Symp. Proc. vol. 831, 2005, Material Research Society, pp. E1.9.1-E1.9.6.
Kelner, G., et al., *Plasma Etching of BETA-SiC*, Journal of the Electrochemical Society, Manchester, New Hampshire, U.S. vol. 134, No. 1, Jan. 1987, pp. 253-254.
Khan, F.A., et al., *High Rate Etching of SiC Using Inductively Coupled Plasma Reactive Ion Etching in SF6-Based Gas Mixtures*, Applied Physics Letters, AIP, American Institute of Physics, Melville, NY, US, vol. 75, No. 15, Oct. 11, 1999, pp. 2268-2270.
Lagoubi et al., *Conditioning of N-Silicon by Photoelectrochimical Etching for Photovoltaic Application*, Proc. of the 11th E.C. Photovoltaic Solar Energy Conference, Oct. 12, 1992-Oct. 16, 1992, pp. 250-253, XP008043956, pp. 252-253, Fig. 8.
Lin et al., *Design and Fabrication of Omnidirectional Reflectors in the Visible Range*, Journal of Modern Otpics, vol. 52, No. 8, May 2005, pp. 1155-1160.
Mimura et al., *Blue Electroluminescence from Pourous Silicon Carbide*, Appl. Phys. Lett 65(26), Dec. 26, 1994, pp. 3350-3352.
Palmour, J.W., et al., *Crystallographic Etching Phenomenon during Plasma Etching of SiC (100) Thin Films in SF6*, Journal of the Electrochemical Society, Electrochemical Society, Manchester, N Hampshire, U.S., vol. 136, No. 2, Feb. 1, 1989, pp. 491-495.
Perduijn et al., *Light Output Feedback Solution for RGB LED Backlight Applications*, SID Digest (2000).
Perrin et al., *Left-Handed Electromagnetism obtained via Nanostructured Metamaterials: Comparison with that from Microstructured Photonic Cyrstals*, Journal of Opics A: Pure and Applied Optics 7 (2005), S3-S11.
Schnitzer, et al., *30% External Quantum Efficieny from Surface Textured, Thin-Film Light-Emitting Diodes*, Applied Physics Lett. 63(16), Oct. 18, 1993, pp. 2174-2176.
Shor, et al., *Direct Observation of Porous SiC formed by Anodization in HF*, Appl. Phys. Lett. 62(22), May 31, 1993, pp. 2836-2838.
Streubel et al., *High Brightness Al GaInP Light-Emitting Diodes*, IEEE Journal on Selected Topis in Quantum Electronics, vol. 8, Now. 2, Mar./Apr. 2002, pp. 321-332.
Windisch et al., *Non-Resonant Cavity Light-Emitting Diodes, In Light Emitting Diodes: Research Manufacturing, and Applications* 1V, H. Walter Yao et al., Proceding of SPIE vol. 3938 (2000), pp. 70-76.
Windisch, R., et al., "40% Efficient Thin-Film Surface-Textured Light-Emitting Diodes by Optimization of Natural Lithography," IEEE Transactions on Electron Devices, ISSN: 0018-9383, vol. 47 No. 7, Jul. 2000, pp. 1492-1498.
Windisch, R., et al., *Impact of Texture-Enhanced Transmission of High-Efficiency Surface-Textured Light-Emitting Diodes*, Applied Physics Letters, vol. 79, No. 15, Oct. 8, 2001, pp. 2315-2317.
Windisch, R., et al., *Light Extraction Mechanisms in High-Efficiency Surface-Textured Light-Emitting Diodes*, IEEE Journal on Selected Topics in Quantum Electronics, vol. 8, No. 2, Mar./Apr. 2002, pp. 248-255.
Zangooie et al., *Surface, Pore Morphology, and Optical Properties of Porous 4H-SiC*, Journal of the Electrochemical Society, 148(6) G297-G302 (2001), Jan. 9, 2001.
Zhu et al., *Optimizing the Performance of Remote Phosphor LED*, First International Conference on White LED's and Solid State Lighting, PW-48 (Nov. 26-30, 2007).
U.S. Appl. No. 11/613,692, filed Dec. 20, 2006.
U.S. Appl. No. 11/614,180, filed Dec. 21, 2006.
U.S. Appl. No. 11/624,811, filed Jan. 19, 2007.
U.S. Appl. No. 11/743,754, filed May 3, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/755,153, filed May 30, 2007.
U.S. Appl. No. 11/856,421, filed Sep. 17, 2007.
U.S. Appl. No. 11/859,048, filed Sep. 21, 2007.
U.S. Appl. No. 11/939,047, filed Nov. 13, 2007.
U.S. Appl. No. 11/936,163, filed Nov. 7, 2007.
U.S. Appl. No. 11/843,243, filed Aug. 22, 2007.
U.S. Appl. No. 11/939,052, filed Nov. 13, 2007.
U.S. Appl. No. 11/939,059, filed Nov. 13, 2007.
U.S. Appl. No. 11/877,038, filed Oct. 23, 2007.
U.S. Appl. No. 11/870,679, filed Oct. 11, 2007.
U.S. Appl. No. 11/948,041, filed Nov. 30, 2007.
U.S. Appl. No. 12/114,994, filed May 5, 2008.
U.S. Appl. No. 12/116,341, filed May 7, 2008.
U.S. Appl. No. 12/117,148, filed May 8, 2008.
U.S. Appl. No. 12/017,676, filed Jan. 22, 2008.
U.S. Appl. No. 12/116,346, filed May 7, 2008.
U.S. Appl. No. 12/116,348, filed May 7, 2008.
U.S. Appl. No. 11/949,182, filed Dec. 3, 2007.
U.S. Appl. No. 11/949,222, filed Dec. 3, 2007.

U.S. Appl. No. 12/002,429, filed Dec. 14, 2007.
U.S. Appl. No. 12/045,729, filed Mar. 11, 2008.
U.S. Appl. No. 11/818,818, filed Jun. 14, 2007.

U.S. Appl. No. 11/408,648, filed Apr. 21, 2006.

* cited by examiner

OPTICAL ELEMENTS WITH INTERNAL OPTICAL FEATURES AND METHODS OF FABRICATING SAME

CROSS-REFERENCE TO RELATED APPLICATIONS

This application claims the benefit of U.S. Provisional Patent Application No. 60/950,193, filed Jul. 17, 2008, the entirety of which is incorporated herein by reference.

This application claims the benefit of U.S. Provisional Patent Application No. 61/023,973, filed Jan. 28, 2008, the entirety of which is incorporated herein by reference.

FIELD OF THE INVENTION(S)

This inventive subject matter relates to optical elements, such as optical diffusers and/or the fabrication of optical elements.

BACKGROUND OF THE INVENTION(S)

A large proportion (some estimates are as high as twenty-five percent) of the electricity generated in the United States each year goes to lighting. Accordingly, there is an ongoing need to provide lighting which is more energy-efficient.

There exist a wide variety of optical elements, such as optical diffusers and light mixing devices. In view of the significant amount of energy which goes into lighting, there is an ongoing need for optical elements which more effectively provide desired effects to light.

In addition, it is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes. Moreover, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications, in particular, for general illumination. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (lm/W), and/or duration of service. Solid state light emitters, however, present challenges in a variety of areas, including mixing and diffusion, because they typically provide very high brightness in a localized area and are highly color saturated (and when they are coupled with lumiphors to produce broad spectrum light, such emitted light is nonetheless colored and must be mixed with other colored light, e.g., where white light is desired for general illumination).

BRIEF SUMMARY OF THE INVENTIVE SUBJECT MATTER

According to a first aspect of the present inventive subject matter, there is provided an optical element, comprising a substrate and at least one optical film, the substrate being at least partially light-transmissive, the optical film comprising at least a first optical feature and being positioned on a surface of the substrate.

In some embodiments according to this aspect of the present inventive subject matter, the optical film and the substrate are adhesively bonded to each other.

In some embodiments according to this aspect of the present inventive subject matter, the optical film and the substrate are molded together.

In some embodiments according to this aspect of the present inventive subject matter, the optical film and the substrate are laminated together.

According to a second aspect of the present inventive subject matter, there is provided a lighting device, comprising at least one solid state light emitter and at least one optical element in accordance with the first aspect of the present inventive subject matter, in which the solid state light emitter and the optical element are positioned and oriented relative to one another such that if light is emitted from the solid state light emitter, at least a portion of the light will pass through the optical element In some embodiments according to this aspect of the present inventive subject matter, the optical film and the substrate are adhesively bonded to each other.

In some embodiments according to this aspect of the present inventive subject matter, the optical film and the substrate are molded together.

In some embodiments according to this aspect of the present inventive subject matter, the optical film and the substrate are laminated together.

According to a third aspect of the present inventive subject matter, there is provided a method of making an optical element, comprising:

positioning within a mold at least one optical film, the optical film comprising at least a first optical feature;

feeding into the mold at least one flowable substrate material;

solidifying the at least one flowable substrate material to form a substrate, the substrate being at least partially light-transmissive and comprising a contact surface which is in contact with the optical film.

According to a fourth aspect of the present inventive subject matter, there is provided a method of making an optical element, comprising:

applying at least one adhesive to at least one of an optical film and a substrate; and bringing the optical film and the substrate together so that the optical film and the substrate are in contact with each other and at least a portion of the adhesive is positioned between the optical film and the substrate, wherein the optical film comprises at least a first optical feature and the substrate is at least partially light-transmissive.

According to a fifth aspect of the present inventive subject matter, there is provided a method of making an optical element, comprising:

laminating an optical film to a substrate such that the optical film is in contact with the substrate, wherein the optical film comprises at least a first optical feature and the substrate is at least partially light-transmissive.

In some embodiments according to the present inventive subject matter, the optical element is used in a general illumination lighting device.

In some embodiments according to the present inventive subject matter, the optical film is positioned directly on the contact surface of the substrate.

In some embodiments according to the present inventive subject matter, the optical film comprises an optical film first surface and an optical film second surface, the optical film second surface is in contact with the contact surface of the substrate, and the optical film second surface is substantially smooth. In some such embodiments, the optical film first surface is substantially smooth. In some such embodiments, a first region of the optical film second surface is substantially uniformly spaced from the contact surface, the first region comprising at least half of the optical film second surface. In some such embodiments, a first region of the optical film second surface is in direct contact with the contact surface, the first region comprising at least half of the optical film second surface. In some such embodiments, the optical film first surface is substantially uniformly spaced from the optical film second surface.

In some embodiments according to the present inventive subject matter:

the optical film comprises an optical film first surface and an optical film second surface, the optical film second surface is in contact with the contact surface of the substrate, the optical film comprises at least a first layer and a second layer, a first layer first surface of the first layer comprises the optical film first surface, the first layer further comprises a first layer second surface, the first optical feature is positioned on the first layer second surface, a second layer second surface of the second layer comprises the optical film second surface, the second layer further comprises a second layer first surface, and the first layer second surface is in contact with the second layer first surface. In some such embodiments, the first layer second surface is in direct contact with the second layer first surface. In some such embodiments, the second layer second surface and/or the first layer first surface is/are substantially smooth. In some such embodiments, the second layer first surface comprises at least a second optical feature. In some such embodiments, the first layer first surface is opposite the first layer second surface, and/or the second layer first surface is opposite the second layer second surface. In some such embodiments, one or more regions between the first layer and the second layer comprise a material (solid, liquid or gaseous) which has an index of refraction which differs from the index of refraction of the first layer second surface and/or which differs from the index of refraction of the second layer first surface.

In some embodiments according to the present inventive subject matter:

the optical film comprises a first layer, the first layer comprises a first layer first surface and a first layer second surface, the first layer second surface is in contact with the contact surface of the substrate, the first optical feature is positioned on the first layer first surface. In some such embodiments, the first layer second surface is substantially smooth. In some such embodiments, the first layer first surface is opposite the first layer second surface.

In some embodiments according to the present inventive subject matter, the substrate is substantially translucent.

In some embodiments according to the present inventive subject matter, the substrate is substantially transparent.

In some embodiments according to the present inventive subject matter, the substrate is lens-shaped. The expression "lens-shaped", as used herein, means any optical shape, e.g., including one or more regions which are concave (of similar or different size and/or radii of curvature), convex (of similar or different size and/or radii of curvature), notched (of similar or different size and/or shape), pointed (of similar or different size and/or shape), combinations of any of the above, etc.

In some embodiments according to the present inventive subject matter, the substrate comprises a substrate second surface, the substrate second surface comprising at least a third optical feature. In some such embodiments, the substrate second surface is opposite from the contact surface. In some such embodiments, the substrate second surface is substantially parallel to the contact surface.

In some embodiments according to the present inventive subject matter, the optical film diffuses light passing through the optical film.

In some embodiments according to the present inventive subject matter, the optical film mixes light passing through the optical film.

In some embodiments according to the present inventive subject matter, the substrate and/or the optical film comprise(s) polycarbonate.

The inventive subject matter may be more fully understood with reference to the accompanying drawings and the following detailed description of the inventive subject matter.

BRIEF DESCRIPTION OF THE DRAWING FIGURES

DETAILED DESCRIPTION OF THE INVENTIVE SUBJECT MATTER

Figure 1:
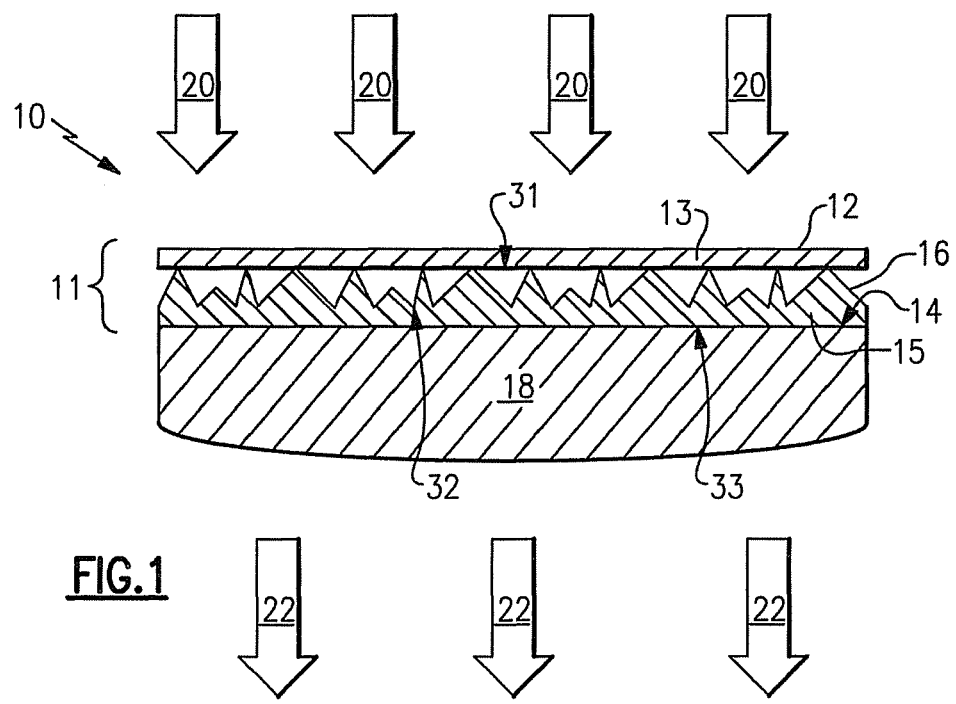
FIG. 1 is a cross-sectional schematic representation of an optical element according to some embodiments of the inventive subject matter.

The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present. In addition, a statement that a first element is "on" a second element is synonymous with a statement that the second element is "on" the first element.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Furthermore, relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "in contact", as used in the present specification, means that the first structure which is "in contact" with a second structure can be in direct contact with the second structure, or can be separated from the second structure by one or more intervening structures (i.e., in indirect contact), where the first and second structures, and the one or more intervening structures each have at least one surface which is in direct contact with another surface selected from among surfaces of the first and second structures and surfaces of the one or more intervening structures.

The expression "in direct contact", as used in the present specification, means that the first structure which is "in direct contact" with a second structure is touching the second structure and there are no intervening structures between the first and second structures at least at some location.

A statement that a first element is "in contact with" a second element is synonymous with a statement that the second element is "in contact with" the first element. Likewise, a statement that a first element is "in direct contact with" a second element is synonymous with a statement that the second element is "in direct contact with" the first element.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

The expression "excited", as used herein when referring to a lumiphor, means that at least some electromagnetic radiation (e.g., visible light, UV light or infrared light) is contacting the lumiphor, causing the lumiphor to emit at least some light. The expression "excited" encompasses situations where the lumiphor emits light continuously or intermittently at a rate such that a human eye would perceive it as emitting light continuously, or where a plurality of lumiphors of the same color or different colors are emitting light intermittently and/or alternatingly (with or without overlap in "on" times) in such a way that a human eye would perceive them as emitting light continuously (and, in cases where different colors are emitted, as a mixture of those colors).

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

Certain embodiments of the present inventive subject matter are described with reference to flowchart illustrations. It should also be noted that in some alternate implementations, the functions/acts noted in the blocks in the flowchart(s) may occur out of the order noted in the flowcharts. For example, two blocks shown in succession may in fact be executed substantially concurrently or the blocks may sometimes be executed in the reverse order, depending upon the functionality/acts involved.

Optical elements according to embodiments of the present inventive subject matter may be particularly well suited to provide optical diffusers and/or optical mixers. In particular, optical diffusers for solid state lighting devices may be provided.

As used herein, the expression "smooth" refers to a surface that does not intentionally contain optical features and is substantially smooth (i.e., flat on a microscopic scale) within manufacturing tolerances.

As used herein, the expression "optical feature" refers to a three dimensional shape that extends from a base plane. The pattern of optical features can be any suitable pattern for providing the desired diffusion/mixing of light incident on the optical film. The pattern can be repeating, pseudo-random or random. The expression "pseudo-random" means a pattern which includes one or more types of random sub-patterns which are repeated. The expression "random" means a pattern which does not include any substantial regions which are repeated.

As used herein, the expression "at least partially light-transmissive", when referring to a particular structure (e.g., a substrate) means that if light is directed toward that structure, at least a portion of the light will pass through the structure.

As used herein, the term "substantially," e.g., in the expressions "substantially smooth", "substantially uniformly spaced", "substantially parallel", "substantially concurrently", "substantially translucent" and "substantially transparent", means at least about 95% correspondence with the feature recited, e.g., "substantially smooth" means that at least 95% of the area of the surface which is characterized as being substantially smooth does not intentionally contain optical features and is smooth within manufacturing tolerances;

"substantially uniformly spaced" means that for at least 95% of the points on one structure, the minimum distance to a point on the other structure differs from an average of such distances by not more than 5%;

"substantially parallel" means that two planes diverge from each other at most by an angle of 5% of 90 degrees, i.e., 4.5 degrees;

"substantially concurrently" means that the respective events each occur within a short period of time, e.g., within one minute, and/or the beginning of one event occurs prior to the end of the other event;

"substantially transparent" means that at least 95% of the structure which is characterized as being substantially transparent is transparent, i.e., allows passage of at least 85% of incident visible light, and "substantially translucent" means that at least 95% of the structure which is characterized as being substantially translucent allows passage of at least some light.

As noted above, in each of the first and second aspects of the present inventive subject matter, there is provided an optical element comprising a substrate and at least one optical film.

The optical substrate may comprise any material which is at least partially light-transmissive. Persons of skill in the art are familiar with, and have ready access to, a wide variety of such materials. The substrate should provide sufficient structural rigidity to support the optical film and, in some embodiments, provides a rigid optical element. Representative examples of suitable materials for use in making the substrate include, but are not limited to, Polycarbonate (PC), Acrylic (PMMA), Polyester (PET), Cyclic Olefin Copolymer (COC), Polyarylate (PAR), Polystyrene, Styrene Acrylonitrile Copolymer (SAN), and/or Acrylic Copolymer (SMMA). In particular embodiments, for example, PC may be used, or PMMA and/or SMMA may be used. Polycarbonate (PC) is naturally transparent, with an ability to transmit light which is nearly equal to that of glass. PC has high strength, toughness, heat resistance, and excellent dimensional and color stability. As noted above, in some embodiments of the present inventive subject matter, the substrate is optically translucent or optically transparent. In some embodiments of the present inventive subject matter, the substrate comprises material which is at least 88% transmissive (and in some embodiments, at least 92% transmissive).

The optical film may comprise any material which is at least partially light-transmissive and which includes at least one optical feature. Persons of skill in the art are familiar with, and have ready access to, a wide variety of such materials. Representative examples of suitable materials out of which the optical film can be made include, but are not limited to, Polycarbonate (PC), polyethylene terephthalate or polyester (PET), Cellulose Acetate, Norbomene Copolymer (Arton G), Polyethylene (PE), and/or High Density Polyethylene (HDPE). As an example, it is believed that Vikuiti optical films from 3M Corporation are PE or PET films with a cured Acrylic (PMMA) layer to form prismatic or light shaping elements.

In some embodiments of the present inventive subject matter, the optical film is optically translucent or optically transparent. In some embodiments of the present inventive subject matter, the optical film comprises material which is at least 88% transmissive (and in some embodiments, at least 92% transmissive).

A representative example of an optical film which would be suitable for use in the optical elements of the present inventive subject matter is a film which has a thickness of from 0.125 mm to 0.75 mm (e.g., 0.25 to 0.50 mm) and in which the optical features have a height (and/or depth) of from 0.5 micron to 750 microns (e.g., 1 or 2 microns to 500 microns, such as about 50 microns). In some embodiments, the optical film has a large enough thickness that it will be able to withstand the handling to which it is subjected in making the optical element and in use, and a small enough thickness that it will remain sufficiently flexible. In some embodiments, the optical film is shaped so that it fits smoothly over the substrate (e.g., where the substrate contact surface is lens-shaped, the optical film is correspondingly lens-shaped so that it will lay on the substrate contact surface without wrinkling).

It is desirable that the optical film be made such that, depending on how it is to be attached to the substrate and how it will be used, at least a sufficient percentage of its optical features will not be crushed or otherwise distorted during manufacture of the optical element or use of the optical element.

Representative optical films and methods of fabricating them are described in United States Patent Application Publications 2005/0058947; 2005/0058948; 2005/0058949; 2006/0061869; 2007/0127129; 2007/0127098; 20070047204; 2007/0014004; 2007/0003868; 2006/0275714; and 2006/0164729

Most optical films have their optical features located on one or both of the exposed faces—if one wants to laminate or adhere such a film to a substrate, superstrate or lens assembly, it is typically necessary to laminate or adhere to the surface that is planar (i.e., a surface which has no optical features, as the optical features would otherwise be "filled in" with the glue or other adherent, which would change, distort and/or destroy the optical nature of the film).

In some embodiments of the present inventive subject matter, there is provided an optical film having one planar surface and optical features positioned on the opposite surface.

In many instances, it is desirable to not have the optical surface (i.e., the surface on which optical features are positioned) exposed to the environment (e.g., room) so that the optical surface is not disturbed later (such as dust, dirt or someone trying to clean the surface of the film).

As noted above, in some embodiments of the present inventive subject matter, a surface of the optical film which is in contact with the contact surface of the substrate is substantially smooth, and in some such embodiments, the optical features of the optical film are not positioned on the opposite surface of the optical film. For example, BrightView Technologies (BVT) makes an optical film for the display industry (Plasma screens, LCD displays/TVs) which is planar on its two exposed surfaces and which has optical features interior to its exposed surfaces. Such an optical film can be made by providing two sheets, each of which are planar on one side and which have optical features on their opposite side, and laminating the sheets together so that their planar surfaces are exterior.

The optical features in the optical film may diffuse light that passes through the optical film. In particular, the optical features may be capable of diffusing and/or mixing light from multiple sources, such as from multiple solid state light emitters (with or without phosphor).

As noted above, in some embodiments according to the present inventive subject matter, the optical film comprises at least a first layer and a second layer, and one or more regions between the first layer and the second layer comprise an intermediate material (solid, liquid or gaseous) which has an index of refraction which differs from the index of refraction of the first layer second surface and/or which differs from the index of refraction of the second layer first surface. The intermediate material can be any suitable material, a variety of which will be readily apparent and which are readily available to those of skill in the art. For example, the intermediate material can be optically translucent or optically transparent. The intermediate material can be air, if desired.

As noted above, the present inventive subject matter is further directed to a lighting device comprising at least one solid state light emitter and at least one optical element in accordance with the first aspect of the present inventive subject matter.

The lighting devices in accordance with the present inventive subject matter can be in any desired shape, including but not limited to in the shape of any conventional lighting device, light bulb and/or fixture, such as any conventional light bulb, any conventional reflector light (e.g., MR-16), any conventional downlight, or generally any bulb replacement (including AC incandescent, low voltage, fluorescent, etc.). Such lighting devices can be use in any desired settings, e.g., for signs, for recessed lighting, for security lighting, for table lamps, for outdoor lighting (e.g., parking), etc.

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

A variety of solid state light emitters are well-known.

For example, one type of solid state light emitter is a light emitting diode.

Light emitting diodes are semiconductor devices that convert electrical current into light. A wide variety of light emitting diodes are used in increasingly diverse fields for an ever-expanding range of purposes.

More specifically, light emitting diodes are semiconducting devices that emit light (ultraviolet, visible, or infrared) when a potential difference is applied across a p-n junction structure. There are a number of well-known ways to make light emitting diodes and many associated structures, and the present inventive subject matter can employ any such devices. By way of example, Chapters 12-14 of Sze, Physics of Semiconductor Devices, (2d Ed. 1981) and Chapter 7 of Sze, Modern Semiconductor Device Physics (1998) describe a variety of photonic devices, including light emitting diodes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode such as (but not limited to) those described in U.S. Pat. Nos. 4,918,487; 5,631,190; and 5,912,477; various wire connections, and a package that encapsulates the light emitting diode.

As is well-known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

Any desired solid state light emitter or emitters can be employed in accordance with the present inventive subject matter. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made).

Where more than one solid state light emitters are provided, the respective light emitters can be similar to one another, different from one another, or any combination (i.e., there can be a plurality of solid state light emitters of one type, or one or more solid state light emitters of each of two or more types)

Representative examples of suitable LEDs are described in:

U.S. Patent Application No. 60/753,138, filed on Dec. 22, 2005, entitled "LIGHTING DEVICE" (inventor: Gerald H. Negley) and U.S. patent application Ser. No. 11/614,180, filed Dec. 21, 2006 (now U.S. Patent Publication No. 2007/0236911), the entireties of which are hereby incorporated by reference;

U.S. Patent Application No. 60/794,379, filed on Apr. 24, 2006, entitled "SHIFTING SPECTRAL CONTENT IN LEDS BY SPATIALLY SEPARATING LUMIPHOR FILMS" (inventors: Gerald H. Negley and Antony Paul van de Ven) and U.S. patent application Ser. No. 11/624,811, filed Jan. 19, 2007 (now U.S. Patent Publication No. 2007/0170447), the entireties of which are hereby incorporated by reference;

U.S. Patent Application No. 60/808,702, filed on May 26, 2006, entitled "LIGHTING DEVICE" (inventors: Gerald H. Negley and Antony Paul van de Ven) and U.S. patent application Ser. No. 11/751,982, filed May 22, 2007 (now U.S. Patent Publication No. 2007/0274080), the entireties of which are hereby incorporated by reference;

U.S. Patent Application No. 60/808,925, filed on May 26, 2006, entitled "SOLID STATE LIGHT EMITTING DEVICE AND METHOD OF MAKING SAME" (inventors: Gerald H. Negley and Neal Hunter) and U.S. patent application Ser. No. 11/753,103, filed May 24, 2007 (now U.S. Patent Publication No. 2007/0280624), the entireties of which are hereby incorporated by reference;

U.S. Patent Application No. 60/802,697, filed on May 23, 2006, entitled "LIGHTING DEVICE AND METHOD OF MAKING" (inventor: Gerald H. Negley) and U.S. patent application Ser. No. 11/751,990, filed May 22, 2007 (now U.S. Patent Publication No. 2007/0274063), the entireties of which are hereby incorporated by reference;

U.S. Patent Application No. 60/793,524, filed on Apr. 20, 2006, entitled "LIGHTING DEVICE AND LIGHTING METHOD" (inventors: Gerald H. Negley and Antony Paul van de Ven) and U.S. patent application Ser. No. 11/736,761, filed Apr. 18, 2007 (now U.S. Patent Publication No. 2007/0278934), the entireties of which are hereby incorporated by reference;

U.S. Patent Application No. 60/857,305, filed on Nov. 7, 2006, entitled "LIGHTING DEVICE AND LIGHTING METHOD" (inventors: Antony Paul van de Ven and Gerald H. Negley and U.S. patent application Ser. No. 11/936,163, filed Nov. 7, 2007 (now U.S. Patent Publication No. 2008/0106895), the entireties of which are hereby incorporated by reference;

U.S. Patent Application No. 60/839,453, filed on Aug. 23, 2006, entitled "LIGHTING DEVICE AND LIGHTING METHOD" (inventors: Antony Paul van de Ven and Gerald H. Negley) and U.S. patent application Ser. No. 11/843,243, filed Aug. 22, 2007 (now U.S. Patent Publication No. 2008/0084685), the entireties of which are hereby incorporated by reference;

U.S. Patent Application No. 60/851,230, filed on Oct. 12, 2006, entitled "LIGHTING DEVICE AND METHOD OF MAKING SAME" (inventor: Gerald H. Negley) and U.S. patent application Ser. No. 11/870,679, filed Oct. 11, 2007 (now U.S. Patent Publication No. 2008/0089053), the entireties of which are hereby incorporated by reference;

U.S. Patent Application No. 60/916,608, filed on May 8, 2007, entitled "LIGHTING DEVICE AND LIGHTING METHOD" (inventors: Antony Paul van de Ven and Gerald H. Negley), and U.S. patent application Ser. No. 12/117,148, filed May 8, 2008 (now U.S. Patent Publication No. 2008/0304261), the entireties of which are hereby incorporated by reference; and U.S. patent application Ser. No. 12/017,676, filed on Jan. 22, 2008 (now U.S. Patent Publication No. 2009/0108269), entitled "ILLUMINATION DEVICE HAVING ONE OR MORE LUMIPHORS, AND METHODS OF FABRICATING SAME" (inventors: Gerald H. Negley and Antony Paul van de Ven), U.S. Patent Application No. 60/982,900, filed on Oct. 26, 2007 (inventors: Gerald H. Negley and Antony Paul van de Ven), the entirety of which is hereby incorporated by reference.

The lighting devices according to the present inventive subject matter can further include one or more lumiphors (i.e., luminescence region or luminescent element which comprises at least one luminescent material). The expression "lumiphor", as used herein, refers to any luminescent element, i.e., any element which includes a luminescent material.

The luminescent material (or materials) can be any desired luminescent material. As noted above, persons skilled in the art are familiar with, and have ready access to, a wide variety of luminescent materials.

For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished in a variety of ways, one representative way being by adding the luminescent materials to a clear or transparent encapsulant material (e.g., epoxy-based, silicone-based, glass-based or metal oxide-based material) as discussed above, for example by a blending or coating process.

For example, one representative example of a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. The first resin portion can be obtained by filling the cup reflector with a resin material and curing it after the light emitting diode chip has been mounted onto the bottom of the cup reflector and then has had its cathode and anode electrodes electrically connected to the leads by way of wires. A luminescent material can be dispersed in the first resin portion so as to be excited with the light A that has been emitted from the light emitting diode chip, the excited luminescent material produces fluorescence ("light B") that has a longer wavelength than the light A, a portion of the light A is transmitted through the first resin portion including the luminescent material, and as a result, light C, as a mixture of the light A and light B, is used as illumination.

Devices in which a lumiphor is provided can, if desired, further comprise one or more clear encapsulant (comprising, e.g., one or more silicone materials, epoxy materials, glass materials or metal oxide materials) positioned between the solid state light emitter (e.g., light emitting diode) and the lumiphor.

Representative examples of lumiphors which are suitable for use in the devices according to the present inventive subject matter include those described in the patent applications referred to above as disclosing light emitting diodes which are suitable for use in the devices according to the present inventive subject matter.

The lighting devices of the present inventive subject matter can be arranged, mounted and supplied with electricity in any desired manner, and can be mounted on any desired housing or fixture. Skilled artisans are familiar with a wide variety of arrangements, mounting schemes, power supplying apparatuses, housings and fixtures, and any such arrangements, schemes, apparatuses, housings and fixtures can be employed in connection with the present inventive subject matter. The lighting devices of the present inventive subject matter can be electrically connected (or selectively connected) to any desired power source, persons of skill in the art being familiar with a variety of such power sources.

For example, representative examples of fixtures which may be used in practicing the present inventive subject matter are described in:

U.S. Patent Application No. 60/752,753, filed on Dec. 21, 2005, entitled "LIGHTING DEVICE" (inventors: Gerald H. Negley, Antony Paul van de Ven and Neal Hunter) and U.S. patent application Ser. No. 11/613,692, filed Dec. 20, 2006 (now U.S. Patent Publication No. 2007/0139923), the entireties of which are hereby incorporated by reference;

U.S. Patent Application No. 60/798,446, filed on May 5, 2006, entitled "LIGHTING DEVICE" (inventor: Antony Paul van de Ven) and U.S. patent application Ser. No. 11/743,754, filed May 3, 2007 (now U.S. Patent Publication No. 2007/0263393), the entireties of which are hereby incorporated by reference;

U.S. Patent Application No. 60/809,618, filed on May 31, 2006, entitled "LIGHTING DEVICE AND METHOD OF LIGHTING" (inventors: Gerald H. Negley, Antony Paul van de Ven and Thomas G. Coleman) and U.S. patent application Ser. No. 11/755,153, filed May 30, 2007 (now U.S. Patent Publication No. 2007/0279903), the entireties of which are hereby incorporated by reference;

U.S. Patent Application No. 60/845,429, filed on Sep. 18, 2006, entitled "LIGHTING DEVICES, LIGHTING ASSEMBLIES, FIXTURES AND METHODS OF USING SAME" (inventor: Antony Paul van de Ven), and U.S. patent application Ser. No. 11/856,421, filed Sep. 17, 2007 (now U.S. Patent Publication No. 2008/0084700), the entireties of which are hereby incorporated by reference;

U.S. Patent Application No. 60/846,222, filed on Sep. 21, 2006, entitled "LIGHTING ASSEMBLIES, METHODS OF INSTALLING SAME, AND METHODS OF REPLACING LIGHTS" (inventors: Antony Paul van de Ven and Gerald H. Negley), and U.S. patent application Ser. No. 11/859,048, filed Sep. 21, 2007 (now U.S. Patent Publication No. 2008/0084701), the entireties of which are hereby incorporated by reference;

U.S. Patent Application No. 60/858,558, filed on Nov. 13, 2006, entitled "LIGHTING DEVICE, ILLUMINATED ENCLOSURE AND LIGHTING METHODS" (inventor: Gerald H. Negley) and U.S. patent application Ser. No. 11/939,047, filed Nov. 13, 2007 (now U.S. Patent Publication No. 2008/0112183), the entireties of which are hereby incorporated by reference;

U.S. Patent Application No. 60/858,881, filed on Nov. 14, 2006, entitled "LIGHT ENGINE ASSEMBLIES" (inventors: Paul Kenneth Pickard and Gary David Trott) and U.S. patent application Ser. No. 11/939,052, filed Nov. 13, 2007 (now U.S. Patent Publication No. 2008/0112168), the entireties of which are hereby incorporated by reference;

U.S. Patent Application No. 60/859,013, filed on Nov. 14, 2006, entitled "LIGHTING ASSEMBLIES AND COMPONENTS FOR LIGHTING ASSEMBLIES" (inventors: Gary David Trott and Paul Kenneth Pickard) and U.S. patent application Ser. No. 11/939,059, filed Nov. 13, 2007 (now U.S. Patent Publication No. 2008/0112170), the entireties of which are hereby incorporated by reference;

U.S. Patent Application No. 60/853,589, filed on Oct. 23, 2006, entitled "LIGHTING DEVICES AND METHODS OF INSTALLING LIGHT ENGINE HOUSINGS AND/OR TRIM ELEMENTS IN LIGHTING DEVICE HOUSINGS" (inventors: Gary David Trott and Paul Kenneth Pickard) and U.S. patent application Ser. No. 11/877,038, filed Oct. 23, 2007 (now U.W. Patent Publication No. 2008/0106907), the entireties of which are hereby incorporated by reference;

U.S. Patent Application No. 60/861,901, filed on Nov. 30, 2006, entitled "LED DOWNLIGHT WITH ACCESSORY ATTACHMENT" (inventors: Gary David Trott, Paul Kenneth Pickard and Ed Adams), the entirety of which is hereby incorporated by reference;

U.S. Patent Application No. 60/916,384, filed on May 7, 2007, entitled "LIGHT FIXTURES, LIGHTING DEVICES, AND COMPONENTS FOR THE SAME" (inventors: Paul Kenneth Pickard, Gary David Trott and Ed Adams), and U.S. patent application Ser. No. 11/948,041, filed Nov. 30, 2007 (inventors: Gary David Trott, Paul Kenneth Pickard and Ed Adams) (now U.S. Patent Publication No. 2008/0137347), the entireties of which are hereby incorporated by reference;

U.S. Patent Application No. 60/916,030, filed on May 4, 2007, entitled "LIGHTING FIXTURE" (inventors: "Paul Kenneth Pickard, James Michael LAY and Gary David Trott) and U.S. patent application Ser. No. 12/114,994, filed May 5, 2008 (now U.S. Patent Publication No. 2008/0304269), the entireties of which are hereby incorporated by reference;

U.S. Patent Application No. 60/916,407, filed on May 7, 2007, entitled "LIGHT FIXTURES AND LIGHTING DEVICES" (inventors: Gary David Trott and Paul Kenneth Pickard), and U.S. patent application Ser. No. 12/116,341, filed May 7, 2008 (now U.S. Patent Publication No. 2008/0278952), the entireties of which are hereby incorporated by reference;

U.S. Patent Application No. 61/029,068, filed on Feb. 15, 2008, entitled "LIGHT FIXTURES AND LIGHTING DEVICES" (inventors: Paul Kenneth Pickard and Gary David Trott), U.S. Patent Application No. 61/037,366, filed on Mar. 18, 2008, and U.S. patent application Ser. No. 12/116,346, filed May 7, 2008 (now U.S. Patent Publication No. 2008/0278950), the entireties of which are hereby incorporated by reference; and U.S. patent application Ser. No. 12/116,348, filed on May 7, 2008 (now U.S. Patent Publication No. 2008/0278957), entitled "LIGHT FIXTURES AND LIGHTING DEVICES" (inventors: Paul Kenneth Pickard and Gary David Trott), the entirety of which is hereby incorporated by reference.

The optical elements according to the present inventive subject matter can have any desired shape, a wide variety of which will be readily apparent to persons skilled in the art. For example, the present inventive subject matter includes optical elements which are shaped like the diffusers described in any of the patent applications described above, e.g., U.S. Patent Application No. 60/861,901, filed on Nov. 30, 2006), U.S. Patent Application No. 60/916,384, filed on May 7, 2007) or U.S. patent application Ser. No. 11/948,041, filed Nov. 30, 2007 (inventors: Gary David Trott, Paul Kenneth Pickard and Ed Adams) (now U.S. Patent Publication No. 2008/0137347), and may include clips or other connecting features such as described in the above-mentioned patent applications.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosed space (uniformly or non-uniformly).

The present inventive subject matter is further directed to an illuminated surface, comprising a surface and at least one lighting device as described herein, wherein if the lighting device is illuminated, the lighting device would illuminate at least a portion of the surface.

The present inventive subject matter is further directed to an illuminated area, comprising at least one item selected from among the group consisting of a swimming pool, a room, a warehouse, an indicator, a road, a vehicle, a road sign, a billboard, a ship, a toy, a mirror, a vessel, an electronic device, a boat, an aircraft, a stadium, a computer, a remote audio device, a remote video device, a cell phone, a tree, a window, a yard, a lamppost, an indicator light, or a device or array of devices that illuminate an enclosure, or a device that is used for edge or back-lighting (e.g., back light poster, signage, LCD displays), having mounted therein or thereon at least one lighting device as described herein.

As noted above, in one aspect, the present inventive subject matter is directed to a method of making an optical element, comprising positioning at least one optical film within a mold, feeding at least one flowable substrate material into the mold, and then solidifying the at least one flowable substrate material to form a substrate.

In such methods, the material used to make the substrate must be moldable. Optically transmissive, optically translucent and optically transparent materials that are suitable for molding, e.g., injection molding, are known to those of skill in the art and, therefore, need not be described further herein.

Persons skilled in the art are familiar with a wide variety of procedures for molding, and this aspect of the present inventive subject matter encompasses all such types of molding. A representative type of molding procedure which is suitable for the present inventive subject matter is injection molding, e.g., film insert molding (FIM).

As noted above, in some embodiments of the present inventive subject matter, there is provided an optical film having one planar surface and optical features positioned on the opposite surface. The optical film could be molded to the substrate using FIM as long as the planar surface of the film contacts the molded optical substrate. In such embodiments, the optical film needs to be robust enough that the optical features are not significantly damaged during the molding process.

While FIM is well-known by persons skilled in the art for creating decorative laminations or for creating photochromic or other optical elements, FIM and other molding lamination techniques may be difficult to apply to the fragile optical features of diffusers for solid state lighting. However, in those embodiments of the present inventive subject matter in which there is employed an optical film with opposing planar surfaces with optical features disposed between the planar surfaces, the difficulties of creating a composite or laminated structure with fine optical features is overcome. The optical film can be an optical film such as provided by BrightView Technologies of Morrisville, N.C. Furthermore, the film should be of sufficient durability such that the internal optical features are not significantly damaged by the manufacturing process to unacceptably degrade performance of the resulting optical component.

The optical film may be secured to an optical substrate from using any number of known techniques. Film insert molding provides an excellent mechanical/chemical bond, and it avoids the need for adhesives that could otherwise affect optical properties and the durability of the resulting structure.

There exist other possible embodiments for the use of FIM to convert an optical film into a final optical element. In some embodiments, the optical film carries all of the optical features. Alternatively, the optical film may carry only part of the desired features, with complementary optical features embedded within or formed on the substrate. In use, light may enter the resulting optical element through the optical film and then exit through the substrate or may enter through the substrate and exit through the optical film.

As noted above, in one aspect, the present inventive subject matter is directed to a method of making an optical element, comprising applying at least one adhesive to at least one of an optical film and a substrate, and bringing the optical film and the substrate together so that the optical film and the substrate are in contact with each other and at least a portion of the adhesive is positioned between the optical film and the substrate.

Persons of skill in the art are familiar with a variety of adhesives which are suitable for use in accordance with the present inventive subject matter, based on the nature of the optical film and the substrate, and any such adhesives can be used. Some such adhesives are substantially translucent or substantially transparent.

As noted above, in one aspect, the present inventive subject matter is directed to a method of making an optical element, comprising laminating an optical film to a substrate such that the optical film is in contact with the substrate.

Persons of skill in the art are familiar with techniques for laminating, and any such technique can be employed, based on the nature of the optical film and the substrate. One example of a well-known type of technique for laminating is coextrusion. Persons of skill in the art are familiar with a variety of coextrusion procedures, and any of such procedures can be employed in the present inventive subject matter.

For example, one way to coextrude a substrate and one or more optical films is to extrude the optical film(s) in its/their primary manufacturing process and heat bond the film(s) to the substrate as the substrate is also being extruded in its primary manufacturing process.

Another representative way to coextrude a substrate and one or more optical films is to extrude the optical film(s) in its/their primary manufacturing process and heat bond the optical film(s) between two layers of substrate (e.g., above and below) to sandwich the film(s) between the substrates during their manufacturing processes.

There are two variations of the processes described in the two preceding paragraphs as well. That is, (1) the optical film(s) could be manufactured and rolled, then taken to the site where the substrates are manufactured, and laminated as part of the extrusion process, or (2) the optical film(s) and the substrate could be extruded simultaneously.

Coextrusion processes can provide several advantages. First, different materials can be provided for different purposes. For instance, people often coextrude a PET (polyethylene terephthalate) film onto a PC (polycarbonate) substrate for outdoor lens and window applications, because PET is far more UV resistant than PC. For an outdoor coextruded lens with the optical film according to the present inventive subject matter, it would be possible, for example, to use a laminate including an acrylic first layer (for optical efficiency and mechanical stability), the optical film, and a UV stabilized material such as PET or U-Polymer (a well-known polyarylate).

Another advantage which can be obtained with a coextrusion process is the ability to put rolled macro features into both sides of the "lens." In many cases, traditional acrylic sheet is coextruded flat and then put through rollers with the optical patterns built on them. In this way, the line runs continuously and the only factor determining the length of the lens is when one decides to cut it. Such a procedure is very useful for making eight foot fluorescent fixtures, for instance. It would be possible, if desired, to provide patterns on both sides of an acrylic sheet—e.g., an RT5 longitudinal feature on the exterior for brightness control, and a patterned feature on the interior to shape the distribution. With an upper and lower layer of extruded acrylic (and with the optical film sandwiched in the center), such an effect could be provided.

Embodiments of the present inventive subject matter are described herein with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

FIG. 1 is a cross-sectional schematic representation of an optical element 10 according to some embodiments of the inventive subject matter. As seen in FIG. 1, the optical element 10 includes an optical film 11 that has a first smooth planar surface 12 (the optical film first surface) of a first layer 13 and a second, opposite, smooth planar surface 14 (the optical film second surface) of a second layer 15. The first layer 13 has a first layer first surface (which is the same as the first planar surface 12) and a first layer second surface 31. The second layer 15 has a second layer first surface 32 and a second layer second surface (which is the same as the second planar surface 14). Disposed between the first and second planar surfaces 12, 14 are optical features 16. The optical features 16 are positioned on the second layer first surface 32. The optical film 11 is mounted on and in direct contact with an optical substrate 18. The first and second planar surfaces 12, 14 are disposed adjacent and parallel to a contact surface 33 of the optical substrate 18. The drawing Figures herein are not drawn to scale, i.e., in the embodiment shown in FIG. 1, the thickness of the first and second layers is much larger than the average height of the optical features 16.

As noted above, as used herein, the term smooth refers to a surface that does not intentionally contain optical features and is substantially smooth (e.g., flat) within manufacturing tolerances. However, because the optical film 11 relies on the optical substrate 18 for mechanical rigidity, the optical film 11 may take on the macroscopic shape of the surface of the optical substrate 18. Thus, for example, if the optical substrate 18 is convex or concave, the optical film 11 may be convex or concave. Accordingly, the planar surfaces 12 and 14 of the optical film 11 may be planar in the microscopic sense (i.e., smooth) while being non-planar in the macroscopic sense.

In particular embodiments of the present inventive subject matter, the optical film 11 and the optical substrate 18 are laminated together, for example, through the use of an adhesive, such as an optically transparent adhesive. In further embodiments, the optical film 11 and the optical substrate 18 are molded together such that the optical film 11 and the optical substrate 18 are mechanically bonded together without adhesive. Intervening layers may be provided between the optical film 11 and the optical substrate 18. However, in some embodiments, the optical film 11 is directly mounted on the optical substrate 18.

The optical film 11 may be fabricated by fabricating two films having optical features defined in one or both of the films, and bonding the two films together. Thus, the optical film 11 may include multiple film layers. Suitable optical films for use in embodiments of the present inventive subject matter may be obtained from Bright View Technologies of Morrisville, N.C. Techniques for fabricating films with optical features are described in United States Patent Application Publication Nos. 2005/0058947; 2005/0058948; 2005/0058949; 2006/0061869; 2007/0127129; 2007/0127098; 20070047204; 2007/0014004; 2007/0003868; 2006/0275714; and 2006/0164729, the disclosures of which are incorporated herein as if set forth in their entirety. Other optical films which may be suitable for use in some embodiments of the present inventive subject matter are those provided by Bayer MaterialScience of Pittsburgh, Pa. and/or Luminit of Torrance, Calif.

The arrows 20 and the arrows 22 show the direction of light passing through the optical element 10 in an embodiment in which the optical element 10 is used. Alternatively, as with any of the embodiments according to the present inventive subject matter, light can be directed through the optical element 10 in the opposite direction or at any desired angle.

Figure 2:
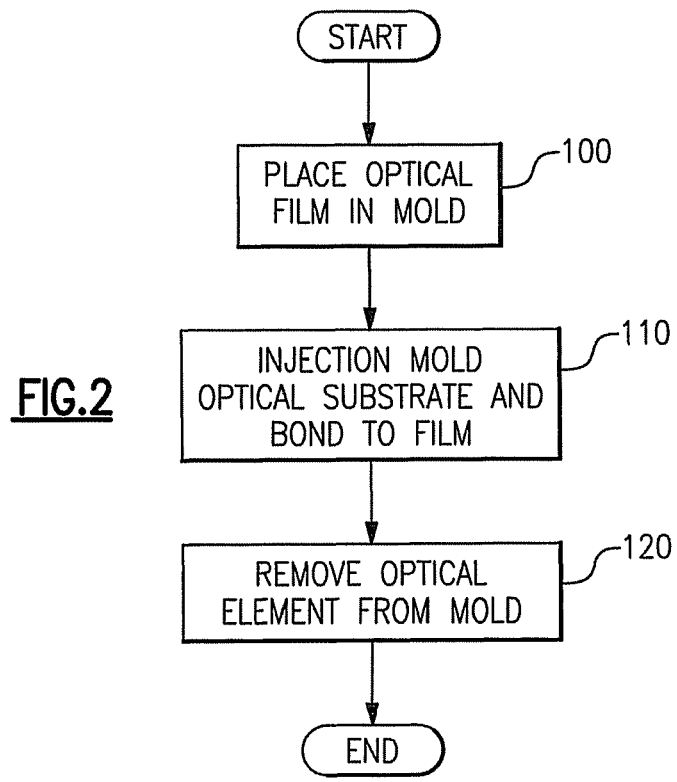
FIG. 2 is a flowchart illustrating operations for fabrication of optical elements according to some embodiments of the present inventive subject matter.
Figure 3:
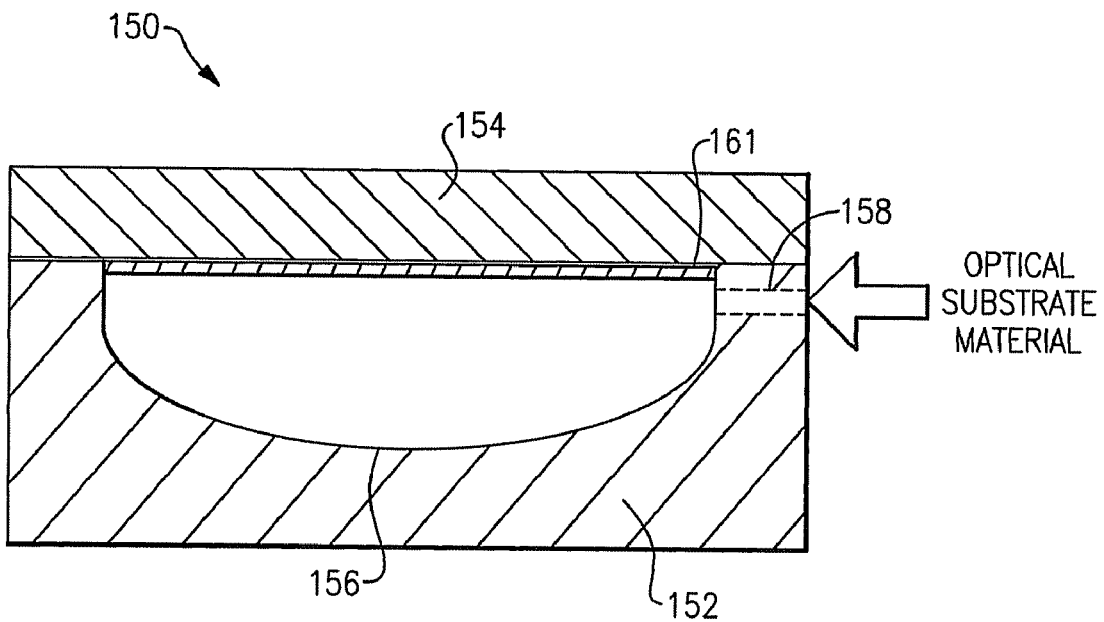
FIG. 3 is a schematic illustration of a film insert molding apparatus suitable for use in some embodiments of the present inventive subject matter.

FIG. 2 is a flowchart illustration of operations for film insert molding according to methods of the present inventive subject matter which will be described with reference to the molding apparatus illustrated in FIG. 3. As seen in FIGS. 2 and 3, an optical film 151 having optical feature incorporated therein is placed in a cavity 156 of a mold 150 (block 100). The mold 150 may include first and second pieces 152 and 154 that mate to form the cavity 156 in the shape of the optical element to be fabricated. The optical film 151 may be placed in the mold by, for example, a pick-and-place system and may be cut, thermally formed or otherwise configured to fit in the cavity 156 of the mold 150. Furthermore, the optical film 151 may be held in the mold in a desired position by any suitable method known to those of skill in the art of film insert molding, such as by vacuum, oversizing the film, pin arrangements or the like.

While the mold 150 is illustrated with two pieces, as will be appreciated by those of skill in the art, other numbers of pieces and other mold configurations may be used in embodiments of the present inventive subject matter. Thus, the present inventive subject matter should not be construed as limited to any particular mold configuration but may use any mold configuration suitable for use in film insert molding and that provides the desired shape of the optical element.

In the embodiments illustrated in FIG. 3, a planar surface of the optical film 151 is in contact with the mold 150 and a planar surface is exposed to the cavity 156. However, in alternative embodiments of the present inventive subject matter, a non-planar surface incorporating optical features may contact the mold 150 with a planar surface being exposed to the cavity 156 (See FIG. 6).

Referring to block 110, the optical substrate material is injected under pressure into the mold 150 through inlets 158 to substantially fill the cavity 156. The optical substrate material may be heated or otherwise made flowable for injection into the mold 150. Through the molding process, the optical substrate material can bond with the optical film 151 to provide a unitized, integral optical element. The formed optical element including the optical substrate and the optical film are then removed from the mold (block 120).

Figure 4:
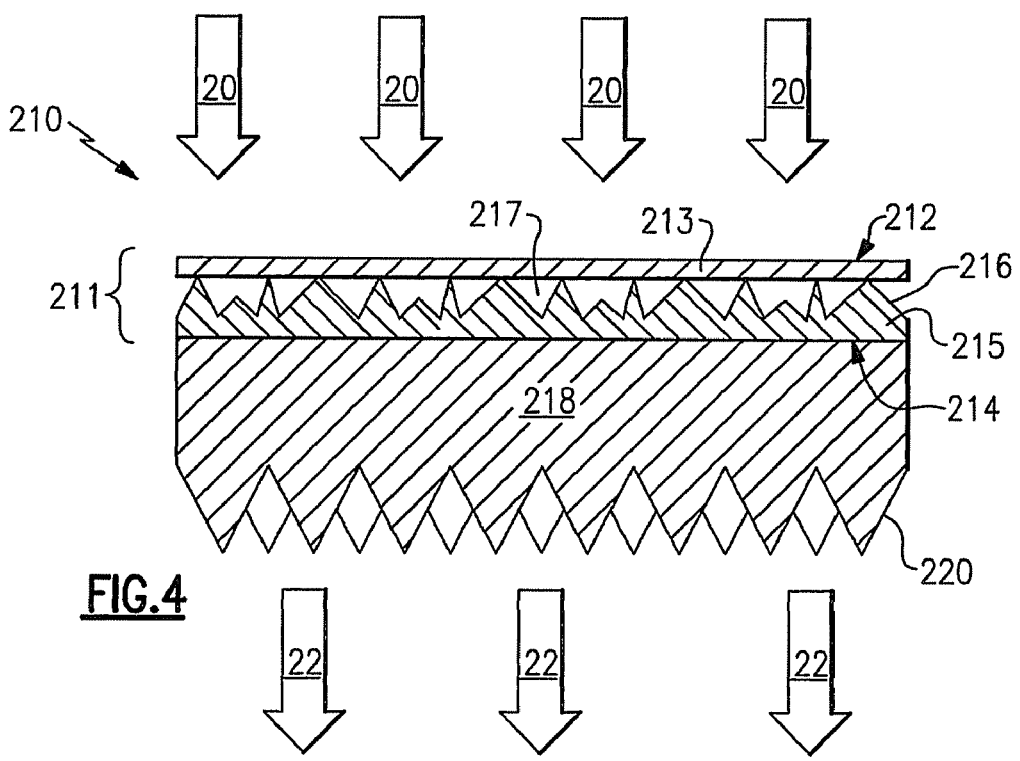
FIG. 4, FIG. 5, FIG. 6 and FIG. 7 are schematic representations of optical elements according to further embodiments of the inventive subject matter.
Figure 5:
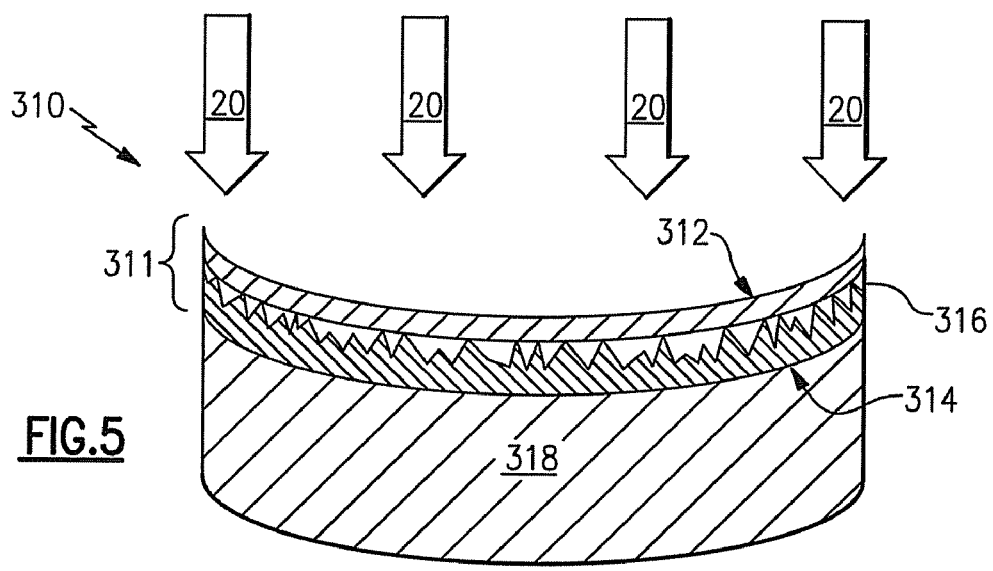
Figure 6:
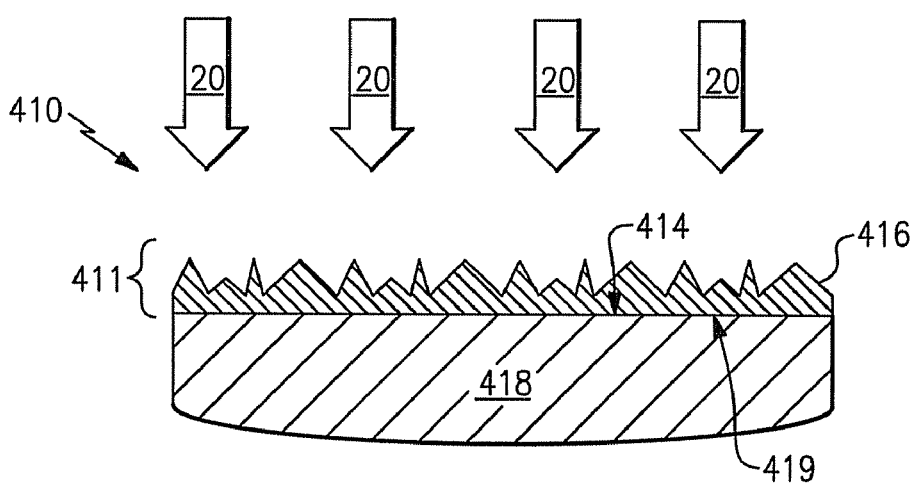

FIGS. 4 through 6 are schematic illustrations of alternative embodiments of the present inventive subject matter. FIG. 4 illustrates an optical element 210 that includes an optical film 211 that has a first smooth planar surface 212 and a second, opposite, smooth planar surface 214. Disposed between the first and second planar surfaces 212, 214 are optical features 216. The optical film 211 is mounted to an optical substrate 218. The first and second planar surfaces 212, 214 are disposed adjacent and parallel to a first surface of the optical substrate 218. The optical film 211 comprises a first layer 213 (which comprises the first planar surface 212) and a second layer 215 (which comprises the second planar surface 214) and an intermediate material 217 which is positioned between the first layer 213 and the second layer 215. In this embodiment, the intermediate material 217 comprises a solid material, but in other embodiments, the intermediate material 217 can instead be a liquid material or a gaseous material (e.g., air).

As is further seen in FIG. 4, the optical element 210 also includes optical features 220 on or incorporated in the optical substrate 218. The optical features 220 of the substrate 218 may function in cooperation with the optical features 216 of the optical film 211 to provide the desired optical effect. For example, in a solid state lighting application, the optical features 220 and 216 may combine to obscure individual light sources even though neither the optical features 220 nor the optical features 216 individually would obscure the light sources.

FIG. 5 illustrates further embodiments of the present inventive subject matter where an optical element 310 includes a smooth non-planar surface (i.e., planar in a microscopic sense and non-planar in a macroscopic sense) where the optical film 311 is bonded. Thus, the optical element 310 includes an optical film 311 that has a first non-planar surface 312 and a second, opposite, smooth non-planar surface 314. Disposed between the first and second surfaces 312, 314 are optical features 316. The optical film 311 is mounted on an optical substrate 318. The first surface 312 and the second surface 314 are evenly spaced from each other and conform to the shape of the optical substrate 318. The first and second surfaces 312, 314 are disposed adjacent to and each is substantially uniformly spaced from the contact surface of the optical substrate 318. As discussed above, the optical film 311 can be preformed or otherwise precut to fit into or on the shape of the optical substrate 318. While FIG. 5 illustrates a concave shape, other shapes, such as convex, may be utilized as long as the optical film may conformally bond or be adhered to the shape.

FIG. 6 illustrates further embodiments of the present inventive subject matter where an optical element 410 includes an optical film 411 that has optical features 416 formed on one side of the film. As seen in FIG. 6, the optical element 410 includes an optical film 411 that has a first smooth planar surface 414 and optical features 416 disposed on the optical film 411 opposite the first planar surface 414. The optical film 411 is mounted on an optical substrate 418. The first planar surface 414 is disposed adjacent and parallel to a first surface 419 of the optical substrate 418.

Figure 7:
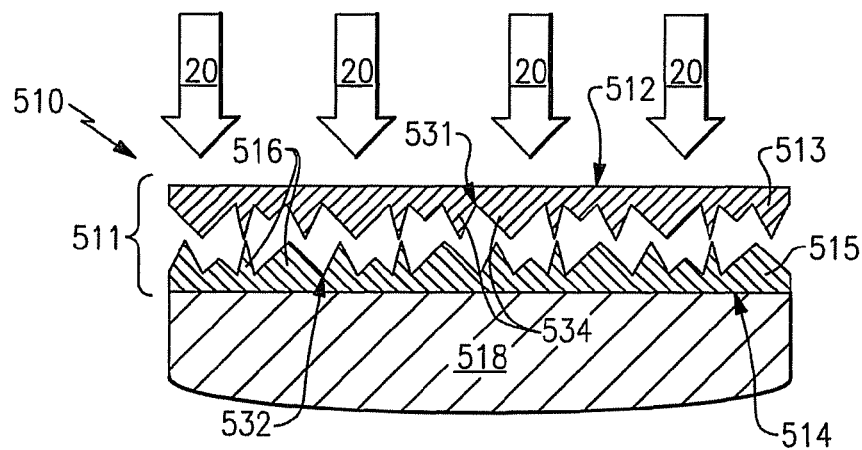
Figure 7:
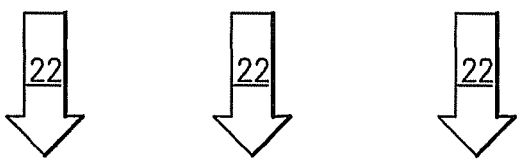

FIG. 7 is a cross-sectional schematic representation of an optical element 510 according to some embodiments of the inventive subject matter. The optical element 510 is similar to the optical element 10 depicted in FIG. 1, except that the optical element 510 in FIG. 7 includes an optical film 511 which comprises a first layer 513 and a second layer 515, wherein the first layer 513 has a substantially smooth planar first layer first surface 512 and a first layer second surface 531 on which optical features 534 are positioned, and the second layer 515 has a substantially smooth planar second layer second surface 514 (in direct contact with a substrate 518) and a second layer first surface 532 on which optical features 516 are positioned.

Figure 8:
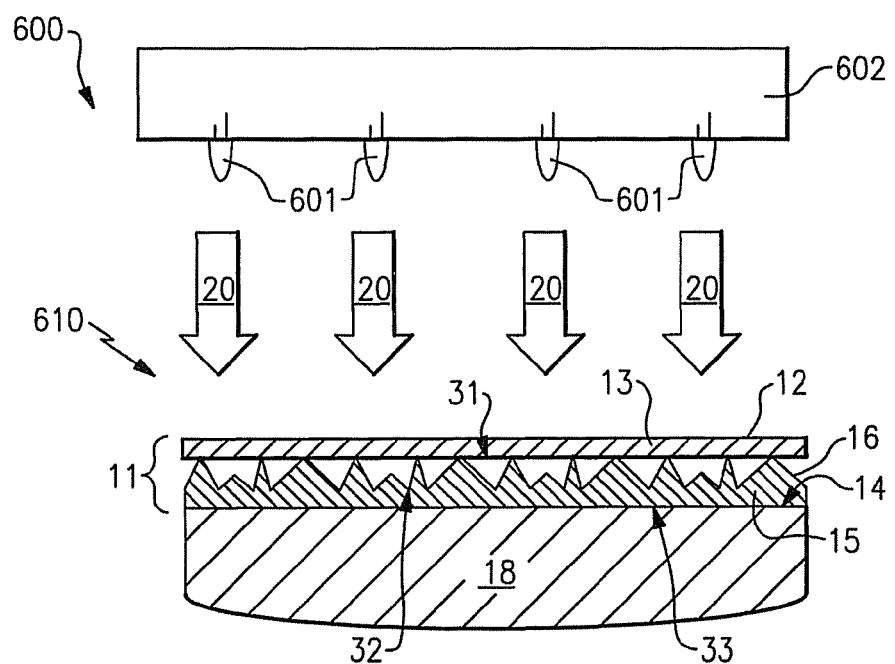
FIG. 8 is a schematic representation of a lighting device according to further embodiments of the inventive subject matter.
Figure 8:
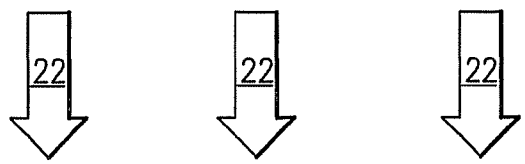

FIG. 8 is a cross-sectional schematic representation of a lighting device 600 according to some embodiments of the inventive subject matter. The lighting device 600 includes a plurality of LEDs 601 mounted on a mounting element 602 and an optical element 610. The optical element 610 is similar to the optical element 10 depicted in FIG. 1.

The lighting device 600 depicted in FIG. 8 is shown schematically. The lighting device 600 can be in any desired shape, e.g., in the shape of any conventional lighting device, light bulb and/or fixture, such as any conventional light bulb, any conventional reflector light (e.g., MR-16), any conventional downlight, or generally any bulb replacement (including AC incandescent, low voltage, fluorescent, etc.). Such lighting devices can be use in any desired settings, e.g., for signs, for recessed lighting, for security lighting, for table lamps, for outdoor lighting (e.g., parking), etc.

While embodiments of the present inventive subject matter have been illustrated with reference to light entering the optical element on the side of the optical element with the optical film and exiting though the optical substrate, in some embodiments of the present inventive subject matter, light can enter through the optical substrate and exit from the optical film.

Certain embodiments of the present inventive subject matter have been described with reference to film insert molding to connect the optical film with the optical substrate. However, in alternative embodiments, the optical film can be adhered to the optical substrate rather than the optical substrate molded to the optical film. As such, in certain embodiments of the present inventive subject matter, a laminated structure with intermediate adhesives is provided. The optical characteristics of such adhesives as well as the durability of such adhesives should be factored into the selection of such adhesives. Suitable adhesives for use in optical applications are well-known to those of skill in the art, and any such adhesives can be used.

Furthermore, while certain embodiments of the present inventive subject matter have been illustrated with reference to specific combinations of elements, various other combinations may also be provided without departing from the teachings of the present inventive subject matter. For example, the optical substrate 218 with the incorporated optical features 220 could be used as the substrate in the embodiments illustrated in FIGS. 5 and 6. Thus, the present inventive subject matter should not be construed as limited to the particular exemplary embodiments illustrated in the Figures but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the lighting devices described herein can be integrated. Any structural part of the lighting devices described herein can be provided in two or more parts (which are held together, if necessary). Similarly, any two or more functions can be conducted simultaneously, and/or any function can be conducted in a series of steps.

The invention claimed is:

1. An optical element, comprising:
   a substrate, said substrate at least partially light-transmissive, said substrate comprising a contact surface;
   at least one optical film, said optical film on said contact surface of said substrate, said optical film comprising at least a first optical feature, said optical film comprising an optical film first surface, and an optical film second surface,
   said optical film second surface in contact with said contact surface of said substrate,
   said optical film second surface substantially smooth, and said optical film first surface substantially smooth.

2. An optical element as recited in claim 1, wherein said optical film is directly on said contact surface of said substrate.

3. An optical element as recited in claim 1, wherein a first region of said optical film second surface is substantially uniformly spaced from said contact surface, said first region comprising at least half of said optical film second surface.

4. An optical element as recited in claim 1, wherein a first region of said optical film second surface is in direct contact with said contact surface, said first region comprising at least half of said optical film second surface.

5. An optical element as recited in claim 1, wherein said optical film first surface is substantially uniformly spaced from said optical film second surface.

6. An optical element comprising:
   a substrate, said substrate at least partially light-transmissive, said substrate comprising a contact surface;
   at least one optical film, said optical film on said contact surface of said substrate, said optical film comprising at least a first optical feature,
   said optical film comprising an optical film first surface and an optical film second surface,
   said optical film second surface in contact with said contact surface of said substrate,
   said optical film comprising at least a first layer and a second layer,
   a first layer first surface of said first layer comprising said optical film first surface,
   said first layer further comprising a first layer second surface,
   said first optical feature on said first layer second surface,
   a second layer second surface of said second layer comprising said optical film second surface,
   said second layer further comprising a second layer first surface, and
   said first layer second surface in contact with said second layer first surface.

7. An optical element as recited in claim 6, wherein said optical film further comprises at least one intermediate material between said first layer and said second layer.

8. An optical element as recited in claim 7, wherein said intermediate material comprises a solid material.

9. An optical element as recited in claim 7, wherein said intermediate material comprises air.

10. An optical element as recited in claim 6, wherein said first layer second surface is in direct contact with said second layer first surface.

11. An optical element as recited in claim 6, wherein said second layer second surface is substantially smooth.

12. An optical element as recited in claim 11, wherein said first layer first surface is substantially smooth.

13. An optical element as recited in claim 6, wherein said first layer first surface is substantially smooth.

14. An optical element as recited in claim 6, wherein said second layer first surface comprises at least a second optical feature.

15. An optical element as recited in claim 6, wherein said first layer first surface is opposite said first layer second surface.

16. An optical element as recited in claim 6, wherein said second layer first surface is opposite said second layer second surface.

17. An optical element comprising:
   a substrate, said substrate at least partially light-transmissive, said substrate comprising a contact surface;
   at least one optical film, said optical film on said contact surface of said substrate, said optical film comprising at least a first optical feature,
   said optical film comprising a first layer,
   said first layer comprising a first layer first surface and a first layer second surface,
   said first layer second surface in contact with said contact surface of said substrate,
   said first optical feature on said first layer first surface.

18. An optical element as recited in claim 17, wherein said first layer second surface is substantially smooth.

19. An optical element as recited in claim 17, wherein said first layer first surface is opposite said first layer second surface.

20. An optical element as recited in claim 1, wherein said substrate is substantially translucent.

21. An optical element as recited in claim 1, wherein said substrate is substantially transparent.

22. An optical element as recited in claim 1, wherein said substrate is lens-shaped.

23. An optical element as recited in claim 1, wherein said substrate comprises a substrate second surface, said substrate second surface comprising at least a third optical feature.

24. An optical element as recited in claim 23, wherein said substrate second surface is opposite from said contact surface.

25. An optical element as recited in claim 24, wherein said substrate second surface is substantially parallel to said contact surface.

26. An optical element as recited in claim 1, wherein said optical film diffuses light passing through said optical film.

27. An optical element as recited in claim 1, wherein said optical film mixes light passing through said optical film.

28. An optical element as recited in claim 1, wherein said optical film and said substrate are adhesively bonded to each other.

29. An optical element as recited in claim 1, wherein said optical film and said substrate are molded together.

30. An optical element as recited in claim 1, wherein said optical film and said substrate are laminated together.

31. An optical element as recited in claim 30, wherein said optical film and said substrate are coextruded.

32. An optical element as recited in claim 1, wherein said substrate comprises polycarbonate.

33. An optical element as recited in claim 32, wherein said optical film comprises polycarbonate.

34. An optical element as recited in claim 1, wherein said optical film comprises polycarbonate.

35. A lighting device, comprising:
   at least one optical element as recited in claim 1; and
   at least one solid state light emitter,
   said solid state light emitter and said optical element positioned and oriented relative to one another such that if light is emitted from said solid state light emitter, at least a portion of said light will pass through said optical element.

36. A lighting device as recited in claim 35, wherein said lighting device comprises a plurality of solid state light emitters, said solid state light emitters and said optical element positioned and oriented relative to one another such that for each said solid state light emitter, if light is emitted from said solid state light emitter, at least a portion of said light will pass through said optical element.

37. A lighting device as recited in claim 35, wherein said lighting device is in the shape of a light bulb, a conventional reflector light or a downlight.

38. An illuminated enclosure, comprising an enclosed space and at least one lighting device as recited in claim 35, wherein said lighting device illuminates at least a portion of said enclosure.

39. An illuminated surface, comprising a surface and at least one lighting device as recited in claim 35, wherein if said lighting device is illuminated, said lighting device would illuminate at least a portion of said surface.

40. An illuminated area, comprising at least one item selected from among the group consisting of a swimming pool, a room, a warehouse, an indicator, a road, a vehicle, a road sign, a billboard, a ship, a toy, a mirror, a vessel, an electronic device, a boat, an aircraft, a stadium, a computer, a remote audio device, a remote video device, a cell phone, a tree, a window, a yard, a lamppost, an indicator light, or a device or array of devices that illuminate an enclosure, or a device that is used for edge or back-lighting, having mounted therein or thereon at least one lighting device as recited in claim 35.

41. An optical element as recited in claim 17, wherein:
   said optical film comprises a second layer,
   said second layer comprises a second layer first surface and a second layer second surface, and
   said second layer second surface faces said first layer first surface.

42. An optical element as recited in claim 41, wherein said second layer second surface comprises at least a second optical feature.

43. An optical element comprising:
   a substrate, said substrate at least partially light-transmissive, said substrate comprising a contact surface;
   at least one optical film, said optical film comprising at least a first layer and a second layer,
   said first layer comprising a first layer first surface and a first layer second surface,
   said second layer comprising a second layer first surface and a second layer second surface,
   said second layer second surface in contact with said contact surface of said substrate,
   said first layer second surface facing said second layer first surface,
   at least a first optical feature on said first layer second surface.

44. An optical element, comprising:
   a substrate, said substrate at least partially light-transmissive, said substrate comprising a contact surface;
   at least one optical film, said optical film on said contact surface of said substrate, said optical film comprising at least a first optical feature,
   said optical film and said substrate molded together.

* * * * *

UNITED STATES PATENT AND TRADEMARK OFFICE
CERTIFICATE OF CORRECTION

PATENT NO. : 8,123,384 B2
APPLICATION NO. : 12/174053
DATED : February 28, 2012
INVENTOR(S) : Gerald H. Negley and Paul Kenneth Pickard It is certified that error appears in the above-identified patent and that said Letters Patent is hereby corrected as shown below:

Title Page, Item (75) Inventors:

*please change* "Gerald H. Negley, Durman, NC (US), Paul Kenneth Pickard, Morrisville, NJ (US)" to --Gerald H. Negley, Durham, NC (US), Paul Kenneth Pickard, Morrisville, NC (US)--

Item (60) Related U.S. Application Data:

*please change* "Provisional application No. 60/950,193, filed on Jul. 17, 2008, provisional application No. 61/023,973, filed on Jan. 28, 2008" to --Provisional application No. 60/950,193, filed on Jul. 17, 2007, provisional application No. 61/023,973, filed on Jan. 28, 2008--

Column 1

*Line 9*: please change "2008" to --2007--

Signed and Sealed this
Tenth Day of July, 2012

David J. Kappos
*Director of the United States Patent and Trademark Office*